UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN SOLUTIONS FOR CHEMICAL TELEGRAPH-PAPER.

Specification forming part of Letters Patent No. 160,403, dated March 2, 1875; application filed June 1, 1874.

CASE No. 84.

*To all whom it may concern:*

Be it known that I, THOMAS A. EDISON, of Newark, in the county of Essex and State of New Jersey, have invented an Improvement in Chemical Paper for Receiving-Telegraph Instruments, of which the following is a specification:

I employ tannin and hydrosulphuret of ammonia in water, and prefer to add a small quantity of chloride of sodium to increase the conductivity of the parts.

The tannin may be an extract of nut-galls, but pyrogallic acid or tannic acid may be employed.

I find the tincture of nut-galls about one-half ounce, five drops of hydrosulphuret of ammonia, and a pint of water, filtered, form a very sensitive solution for moistening paper for a telegraphic receiving-instrument.

I claim as my invention—

The solution for chemical telegraph-paper prepared with tannin and hydrosulphuret of ammonia, substantially as set forth.

Signed by me this 29th day of October, A. D. 1873.

THOMAS A. EDISON.

Witnesses:
GEO. T. PINCKNEY,
CHAS. H. SMITH.